Feb. 11, 1969   N. F. CARDARELLI ETAL   3,426,473
ANTIFOULING COVERING
Filed March 31, 1966
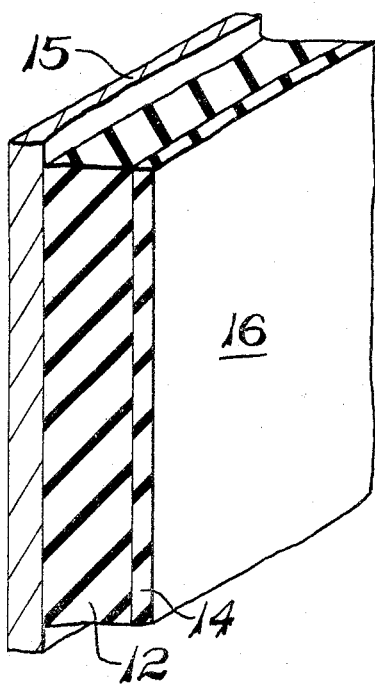
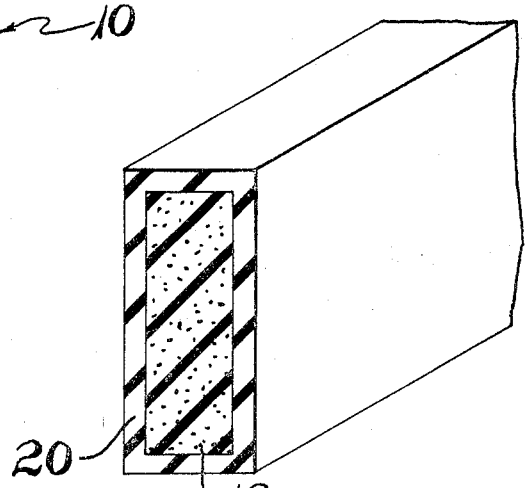
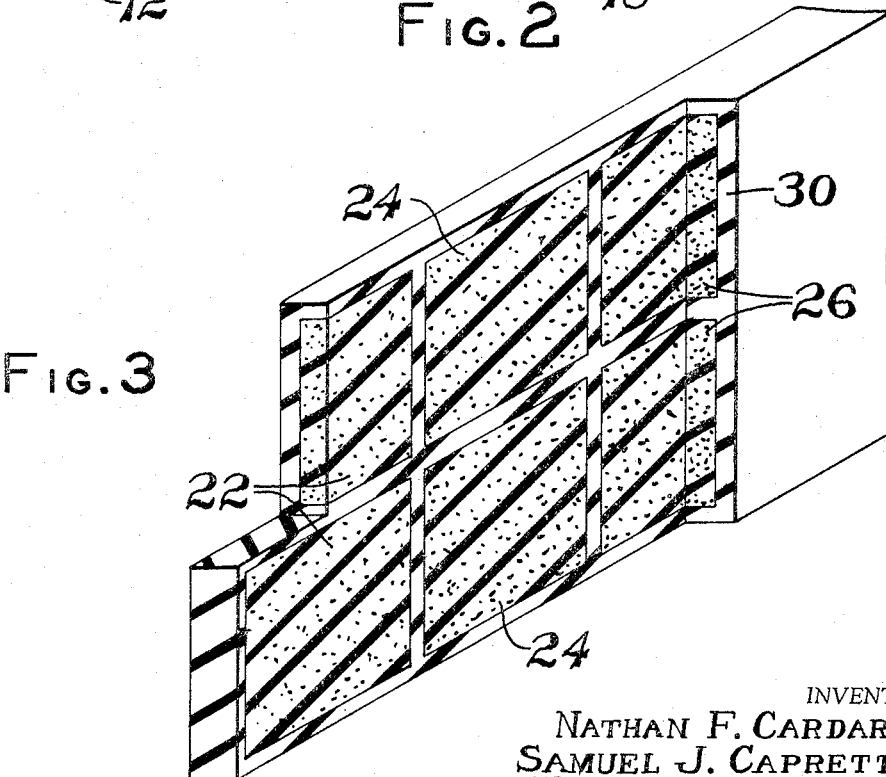
INVENTORS
NATHAN F. CARDARELLI
SAMUEL J. CAPRETTE, JR.
BY
John D. Haney
ATTY.

United States Patent Office 3,426,473
Patented Feb. 11, 1969

---

3,426,473
ANTIFOULING COVERING
Nathan F. Cardarelli, Copley, and Samuel J. Caprette, Jr., Chagrin Falls, Ohio, assignors to The B. F. Goodrich Company, New York, N.Y., a corporation of New York
Filed Mar. 31, 1966, Ser. No. 539,177
U.S. Cl. 43—131      10 Claims
Int. Cl. A01m *1/20;* C09d *5/14;* E02d *5/60*

The present invention relates to coverings resistant to fouling by barnacles, bryozoans, hydroids, algae, bugula, tunicates and corresponding fouling genera commonly present in sea water. These coverings are preferably laminates in the form of sheets or strips which may be adhered or fastened directly to a ship hull, buoy, pier piling or other objects immersed in sea water, or the coverings may be applied by spraying. Alternatively, major structural parts of many immersible objects may be made directly from these compositions.

One of man's more ancient technical problems has been in retarding the growth of marine organisms on submerged objects such as ship hulls, and the cleaning or removal of incrustations of these organisms. Until the early part of this century, practical antifouling techniques had not varied appreciably since the Phoenicians and their contemporaries discovered that fouling is retarded by cladding ship hulls in copper sheets, or by paints containing salts of copper, mercury or arsenic which poison some of the more objectionable fouling genera.

In more recent years, efforts to retard marine fouling have been focused on the development of improved paint vehicles for dispersing the familiar copper or mercury salts, or other known toxic chemicals. Inasmuch as the most effective marine antifouling toxics happen to be chemically insoluble in the useful paint vehicles, the toxic is either leached rapidly from the typical paint film, or the paint film is designed to exfoliate to expose the toxic to the sea water. In either case the effective foul-free life is very limited and the cost of using such paints on an object such as a ship hull or any permanently submerged object is exceedingly high.

Certain organotin compounds are known to be toxic to a wide spectrum of marine fouling organisms and although these compounds are insoluble in the best known paint vehicles (such as vinyl, epoxy or acrylic polymers), these compounds have been found to be soluble in certain elastomers without degradation of the elastomer or impairing its physical properties. The resulting elastomeric compositions are not only resistant to sea water but have an effective toxic life for resisting marine fouling which may be measured in years compared to the effective life of the best known paints for this purpose which is ordinarily measured in weeks or months.

These elastomeric antifouling compounds are believed to function to resist fouling by a solubility mechanism, as distinguished from the leaching or exfoliation mechanism characteristic of traditional antifouling paints. That is to say, the soluble organotin toxics form and tend to maintain an equilibrium dispersion in the elastomer and at its surface exposed to fouling organisms. As the surface molecules are progressively dissolved by sea water to poison or repel incipient fouling, additional toxic migrates to the surface to continue the effort. Accordingly, there is an orderly progressive release of the surface toxic which occurs without damaging the elastomer itself.

According to the present invention, an improved antifouling covering is provided which includes two or more layers of elastomers of the foregoing class. These coverings are specially designed to provide for the release of toxic from the covering surface at the sea water interface at a regulated, reasonably predictable rate. One particular advantage of these coverings is that they may be designed to provide a given foul-free life with a minimum weight of elastomeric material and, therefore, in most applications are more economical than solid single sheets of the foregoing antifouling compositions.

These improved coverings include at least one reservoir layer, and a toxic transfer control layer between the reservoir layer and the surface of the covering adapted for exposure to the fouling organisms. The reservoir layer is an elastomer preferably of the type in which a toxic may be dissolved in quantities at or significantly greater than the solubility limit of the toxic in the elastomer. Additionally (or alternatively) the reservoir layer may be a highly porous sponge-like cellular material in which the toxic agent is suspended so that it saturates the cells of the sponge material.

The toxic transfer control layer regulates the rate of transfer of the toxic from the reservoir layer to the side of the covering exposed to water containing the marine fouling organisms. The transfer control layer is an elastomer of the type in which the toxic is soluble but the material for this layer is selected so that toxic is transferred through the control layer at a rate which is appreciably slower than the rate at which the toxic is transferred to this layer from the reservoir layer. Another important factor in the selection of the control layer is that it is capable of maintaining a given minimum concentration of the toxic on its surface away from the reservoir layer, which surface is ordinarily the surface exposed to the water.

In addition to the protection these coverings offer to a submerged structure in preventing accumulation of fouling organisms, these covers also function to protect underwater wooden parts from damage by marine borers and gribbles.

Coverings made in accordance with this invention will be explained more fully in connection with the accompanying drawings which show several preferred coverings made according to and embodying this invention.

In the drawings:

FIG. 1 shows a cross section (partly in perspective) of one preferred antifouling covering in which the reservoir layer is a toxic-soluble elastomer in which the toxic can be present in amounts far in excess of its solubility limit in the elastomer;

FIG. 2 shows a cross section, partly in perspective, of another form of covering in which the reservoir layer is a cellular porous material soaked in the toxic agent; and FIG. 3 shows a view, partly in perspective, of another covering with parts removed to better illustrate the construction.

Referring to FIG. 1, the covering 10 has a reservoir layer 12 and a very much thinner toxic transfer control layer 14 laminated to layer 12.

The covering 10 is adhesively attached to a submersible object 15 (which may be a ship hull, part of a pier, buoy, etc.) so that sea water acts against the exposed face 16 of the toxic transfer control layer 14. Both layers 12 and 14 in FIG. 1 are elastomers in which a toxic agent is soluble, that is to say, capable of containing the toxic in a reasonably uniform dispersion throughout. The reservoir layer 12, however, is preferably an elastomer which has very much greater solubility limit than does control layer 14. Moreover, the reservoir layer preferably is saturated with the toxic agent far beyond its actual solubility limit so that regardless of the initial quantity of the toxic agent dissolved in control layer 14, a quantity of the toxic will continuously migrate to and will dissolve into and disperse itself through the control layer 14 up to its solubility limit and will provide the desired minimum concentration of the toxic on the outer face of the control layer.

By the equilibrium dispersion effect, the toxic agent at the water interface of the control layer 14 will progressively dissolve into the sea water to provide fouling resistance at this interface. Even though the toxic is progressively dissolved from this face, however, the total amount of the toxic in control layer 14 will remain uniform because the toxic will be replenished from the reservoir layer 12. Accordingly, the effective foul-free life of the covering can be very accurately designed by selecting the control layer 14 appropriately and by the total quantity of the toxic agent in which the reservoir layer 12 is initially saturated.

In the form of covering shown in FIG. 2, a reservoir layer 18 is provided which is preferably a toxic-soluble elastomer in which the elastomer is a cellular or porous sponge-like material whereas the control layer 20, which in this case completely surrounds the sponge, is a toxic-soluble elastomer having the same properties as layer 14 of FIG. 1. The control layer 20 in the FIG. 2 covering functions like that of control layer 14 in FIG. 1, but an even greater reservoir of the toxic material can be maintained in the reservoir layer 18 not only by super-saturating the elastomer of the reservoir layer, but by soaking the cellular structure of the layer to the maximum extent possible with the toxic agent.

The covering shown in FIG. 3 is made of the same materials as that shown in FIG. 2 and it functions in the same way except that the reservoir layer consists of separate "pads" 22, 24, 26, etc. of a cellular sponge-like material, each of which is completely surrounded by an elastomer control layer 30.

Elastomers useful in the practice of this invention (for both the reservoir layer and for the control layer) are rubbers selected from the class consisting of neoprene (polychloroprene); butyl (isobutylene isoprene copolymer); SBR (styrene-butadiene polymers); CB (cis-polybutadiene); EPO (ethylene-propylene rubber); polyether and polyester urethanes; nitriles (butadiene-acrylonitrile polymers and terpolymers); EPT (ethylene-propylene terpolymer); natural rubber; hydrins (epichlorohydrin rubber); and the silicone rubbers. Particularly useful are elastomers which are vulcanizable or readily cross-linked as with sulfur, sulfur-containing compounds, metal oxides, peroxides, amines and the like.

The preferred antifouling toxic agents are organometallic compounds which are (a) toxic or repellent to the more objectionable marine fouling organisms; (b) soluble in the elastomers; and (c) at least slightly soluble in water. Typical preferred compounds are organotin compounds of formula $R_3SnX$, wherein R is an alkyl or phenyl group. Particularly useful are compounds wherein the alkyl groups contain 3 to 4 carbon atoms. The alkyl or phenyl group usually contains 8 or less carbon atoms. X is one of the following radicals: sulphide, oxide, chloride, fluoride, bromide, chromate, sulphate, nitrate, hydroxide, acetate, octanoate, laurate, resinate, dimethyl dithiocarbamate, naphthenate, paravinylbenzoate, acrylate, methacrylate, isooctylmercaptoacetate, hydride or methoxide. The preferred R group is the N-butyl group. Preferably X is oxygen, sulfur or a halogen. A preferred compound of this class is bis(tri-n-butyltin) oxide. Another highly effective compound is bis(tri-n-butyltin) sulfide.

Typical examples of other compounds of the formula $R_3SnX$ which may be used are bis(tri-n-propyltin) oxide, tri-n-propyltin chloride, triisopropyltin chloride, triamyltinoxide, triisobutyltin chloride, tributyltin acetate, tributyltin chloride, triphenyltin chloride, tributyltin laurate, tributyltin fluoride, tributyltin chromate, tributyltin maleate, amyl diethyltin chloride, butyl dipropyltin chloride, tributyltin hydride, tributyltin resinate, tributyltin isooctylmercaptoacetate, tributyltin dimethyl dithiocarbamate, tributyltin nonanoate, tributyltin naphthenate, hexabutyltin poly(tributyltin) paravinylbenzoate and poly(tributyltin) methacrylate.

A concentration of the organotin toxics will vary with the particular elastomer used and for the foregoing types of elastomers the solubility limit of these toxics varies between about 0.02 part per one hundred of the elastomer (pphr.) to about 25 parts of the elastomer. In accordance with conventional rubber compounding practice, the "parts" specified are parts by weight. In compounding the different layers of these coatings, a controlling factor is to plan the compound so that the toxic transfer control layer is capable of transferring a particular toxic through it at a rate which is appreciably lower than the rate at which the toxic is capable of being transferred through the reservoir layer. In the FIG. 1 type covering, for example, one construction would be to select an elastomer toxic compound in which the elastomer has a very low solubility limit in the toxic and to select a reservoir layer in which the toxic has a very high solubility limit. In this system, this form of covering, therefore, provides the improved results even though the reservoir layer is compounded so the concentration of the toxic agent in the reservoir is merely at the solubility limit or even slightly less than such limit. This form of covering in many cases simplifies the manufacturing problem of adhering the two layers to each other.

If the elastomer is used and the two layers are compatible, ordinarily these layers may be vulcanized directly to each other without the necessity for intervening adhesive. Where the base elastomers are not compatible, there is a wide variety of adhesive systems which may be used to effect intimate bonding of the layers, the selection of the adhesive system being well within the ordinary skill in the art of adhesively bonding rubbers.

Another form of FIG. 1 coating may include a reservoir layer in which the toxic agent is provided in quantities greatly in excess of the solubility limits of the elastomer. In these systems it is usually necessary to include separate adhesives to effect bonding of the layers and while this is an added step in the bonding process, it can ordinarily be accomplished by routine procedures.

In preparing coverings of the type shown in FIGS. 2 and 3, it is ordinarily convenient to use cellular sponge-like material made of the foregoing types of elastomers in which the organotin toxics are soluble but for the purpose of this invention cellular materials may be used in which the organotin additives are not soluble, the toxic merely saturating the cellular structure of the reservoir material. These coverings also ordinarily require adhesive systems to adhere the layers but many such systems are known to the art.

In the preparation of these layers, basic or conventional rubber compounding techniques and equipment are used, and no special manufacturing precautions or equipment are required. Some of the most effective organotin additives are in the form of powders which are dispersed into the elastomer like other dry compounding ingredients. Other of these toxic additives are in the form of oils as they are presently commercially available and these oils also provide some measure of processing assistance in the compounding operations. It is, of course, possible to add the organotin compounds to the elastomer in the polymerization stage of the manufacture of the elastomer if desired. And the toxic compounds may be also added to liquid solutions of the elastomer.

The resulting elastomer compounds may be further processed with conventional rubber machinery and techniques in that the compounds may be extruded, rolled, molded into the forms and shapes desired, or calendered onto fabrics. They may be vulcanized also according to conventional techniques at pressures and temperatures characteristic of the vulcanizing agents and the particular elastomer selected. This may be specifically compounded for room-temperature curing if desired.

These elastomer layers may be vulcanized separately and then adhered to each other to form the coverings described, or the covering layers may be vulcanized after they are laminated. The coverings in turn may be laminated directly to a variety of substrates such as metal plates, wood, plastics, fabrics, concrete, fiberglass and other structural materials, or they may be adhered in situ to any of the foregoing substrates by suitable cements. These coverings may be attached with suitable adhesives to existing underwater structures.

Elastomers used in making the layers of these coverings are rubbers which in the raw or unvulcanized state at room temperature can be stretched repeatedly to at least twice the original length of a sample and upon release of the stress will rapidly return to its approximate original length. Specific examples of typical compositions which may be used for these layers are:

1. NATURAL RUBBER COMPOSITIONS

| Ingredient | For reservoir layer | For control layer |
| --- | --- | --- |
| Natural rubber [1] | 100 | 100 |
| Zinc oxide | 5 | 5 |
| Sulfur | 2.5 | 3 |
| Stearic acid | 2.0 | 3 |
| Channel black | | 50 |
| Benzothiazyl disulfide | 1 | 1 |
| Phenyl beta naphthylamine | 1 | 1 |
| TBTO | 8–20 | 0.02–7 |

[1] NBS Standard Natural Rx 385.

2. NEOPRENE COMPOUNDS (PREFERRED AS RESERVOIR LAYER)

| Ingredient | Parts | | | | |
| --- | --- | --- | --- | --- | --- |
| | 1 | 2 | 3 | 4 [1] | 5 [2] |
| Neoprene GN | 100 | 100 | | | |
| Neoprene WRT | | | 100 | 100 | 100 |
| Zinc oxide | 5 | 5 | 5 | 5 | 5 |
| Magnesium oxide | 4 | 4 | 4 | 4 | 4 |
| Stearic acid | 0.5 | 1 | | | |
| Channel black | | 20–40 | | | |
| Petroleum wax | | | 0–5 | 0–2 | 0–2 |
| FEF black | | | 12–20 | | |
| Phenylbetanapthylamine | | | 2 | 2 | 2 |
| Mercaptobenzylthiazole | | | 1 | 1 | 1 |
| Lauric acid | | | 0–4 | 0–4 | 0–4 |
| TBTO | 8–12 | 8–12 | 8–25 | 8–12 | 8–12 |
| Titanox | | | | 12–30 | 12–30 |
| Pyrazoline red | | | | | 2–5 |

[1] White neoprene.
[2] Red neoprene.

3. BUTYL RUBBER (ALTERNATE PREFERRED RESERVOIR LAYER)

| | Parts |
| --- | --- |
| Butyl rubber (NBS 388) | 100 |
| Zinc oxide | 5 |
| Sulfur | 2 |
| Stearic acid | 3 |
| Benzothiazyldisulfide | 0.5 |
| Tetramethylthiuram disulfide | 1 |
| Channel black | 50 |
| TBTO | 8–14 |

4. NITRILE BUTADIENE Rx

| Ingredient: | |
| --- | --- |
| Nitrile - butadiene Rx (Bound VCN 18–38%) [1] | 100 |
| Semi reinforcing furnace black | 30–45 |
| Stearic acid | 1 |
| Mercaptobenzylthiazole | 1 |
| Sulfur | 1–2 |
| Zinc oxide | 5 |
| TBTO | ([2]) |

[1] For reservoir layer the Bound VCN is 18–22% and for a control layer the Bound VCN is 30–36%.
[2] For reservoir layer use 10–25 pphr. and for the control layer use 0–4 pphr.

In each of the foregoing examples the numerical quantities for the ingredients specified are in parts per hundred parts of the starting rubber ingredient.

In each of the foregoing recipes "TBTO" means bis-(tri-n-butyltin) oxide.

In each of the foregoing recipes, tributyltin oxide (TBTO) may be replaced with tributyltin sulfide, tributyltin fluoride, tributyltin chloride, or tributyltin acetate.

For sponge-like reservoirs any polymer composition capable of being blown into cellular structures may be used. Elastomers of the foregoing class are effective. Also "sponges" made of polyurethane and polyvinyl chloride are satisfactory as a reservoir layer. In cases where the toxic agent is not soluble in the cellular material, the so-called open-celled "sponge" materials are preferred to permit transfer of the toxic.

It is to be understood that many of the compounding ingredients in the foregoing recipes may be varied to provide specific physical properties for the rubber layers in accordance with ordinary rubber compounding skill.

We claim:

1. A covering resistant to marine fouling organisms comprising a reservoir layer of material saturated with a toxic agent for poisoning or repelling marine fouling organisms such as barnacles and the like, and a toxic transfer control layer of elastomeric material in which said toxic agent is soluble between said reservoir layer and the surface of said covering adapted for exposure to sea water containing said fouling organisms, said transfer control layer having a solubility rate such that the transfer layer is capable of dissolving said toxic agent at a rate which is appreciably slower than the rate at which said toxic is transferred to said control layer from said reservoir layer.

2. A covering as defined in claim 1 wherein each said layer is an elastomer in which said toxic agent is soluble, the solubility of said toxic agent in said control layer being appreciably lower than the solubility of said toxic agent in said reservoir layer.

3. A covering as defined in claim 1 wherein said toxic agent is an organotin compound selected from the class consisting of bis(tri-n-butyltin) oxide, bis(tri-n-butyltin) sulfide, bis(tri-n-propyltin) oxide, tri-n-propyltin chloride, triisopropyltin chloride, tri-isobutyltin chloride, tri-butyltin acetate, tributyltin chloride, triphenyltin chloride, tributyltin laurate, tributyltin fluoride, tributyltin chromate, tributyltin maleate, amyl diethyltin chloride, butyl dipropyltin chloride, tributyltin hydride, tributyltin resinate, tributyltin isooctylmercaptoacetate, tributyltin dimethyl dithiocarbamate, tributyltin nonanoate, tributyltin naphthenate, hexabutyltin poly(tributyltin) paravinylbenzoate and poly(tributyltin) methacrylate.

4. A covering according to claim 1 wherein said toxic agent is tributyltin oxide or tributyl sulfide.

5. A covering according to claim 1 wherein each of said layers is an elastomer selected from the class consisting of neoprene (polychloroprene); butyl (isobutylene-isoprene); SBR (styrene-butadiene rubber); CB (cis polybutadiene); EPO (ethylene-propylene rubber); polyether and polyester-urethanes; butadiene-acrylonitrile copolymer and terpolymer rubbers; EPT (ethylene-propylene terpolymer); natural rubber; hydrins (epichlorohydrin rubber); and the silicone rubbers.

6. A covering as defined in claim 1 wherein each of said layers is an elastomer containing, dissolved therein, between 0 and 25 parts of said toxic agent per 100 parts of elastomer, said toxic agent being an organotin compound of formula $R_3SnX$, wherein R is an alkyl or phenyl group and X is one of the following radicals: sulphide, oxide, chloride, fluoride, bromide, chromate, sulphate, nitrate, hydroxide, acetate, laurate resinate dimethyl dithiocarbamate naphthenate, paravinylbenzoate, acrylate, methacrylate, isooctylmercaptoacetate, hydride or methoxide.

7. A covering as defined in claim 1 wherein each of said layers is a vulcanized elastomer selected from the class consisting of neoprene (polychloroprene); butyl (polyisobutylene); SBR (styrene-butadiene polymers); CB (cis polybutadiene); EPO (ethylene-propylene rubber); polyether and polyester urethanes; nitriles (butadiene-acrylonitrile polymers and terpolymers); EPT (ethylene-propylene terpolymer); natural rubber; hydrins (epichlorohydrin rubber); and the silicone rubbers in which is dissolved between 0.02 and 25 parts of a toxic agent per 100 parts of the elastomer, and wherein the toxic agent is an organotin compound selected from the class consisting of bis(n-tributyltin) oxide, bis(n-tri-butyltin) sulfide, tributyltin fluoride, tributyltin chloride, or tributyltin acetate.

8. A covering as defiend in claim 1 wherein said reservoir layer is a sponge-like cellular resilient material having its cells saturated with said toxic agent.

9. A covering as defined in caim 8 wherein said sponge-like cellular material is an elastomeric material in which said toxic agent is soluble.

10. A covering as defined in claim 7 wherein said reservoir layer contains a quantity of said toxic agent significantly greater than the solubility limit of said toxic agent in the elastomer of said layer.

References Cited
UNITED STATES PATENTS

| | | | |
|---|---|---|---|
| 274,425 | 3/1883 | Wells | 167—37 |
| 1,814,471 | 7/1931 | Grove | 117—4 |
| 2,023,270 | 12/1935 | Fischer | 47—1 |
| 2,194,649 | 3/1940 | Fischer | 239—53 |
| 2,344,782 | 3/1944 | Muller | 43—131 X |
| 2,566,092 | 8/1951 | Mayfield | 117—154 |
| 2,613,474 | 10/1952 | Sollers | 43—131 X |
| 3,295,246 | 1/1967 | Landsman et al. | 43—131 |

ALDRICH F. MEDBERY, *Primary Examiner.*

U.S. Cl. X.R.

106—15; 239—53; 61—54; 117—77